Patented Dec. 28, 1948

2,457,209

UNITED STATES PATENT OFFICE 2,457,209

RESINOUS COMPOSITIONS

William B. Clark, Wilmington, Del., assignor to E. I. du Pont de Nemours & Company, Wilmington, Del., a corporation of Delaware No Drawing. Application January 4, 1945, Serial No. 571,372

7 Claims. (Cl. 260—72)

This invention relates to improvement in resinous compositions, and more particularly to an improved adhesive composition adapted for use in the manufacture of laminated materials.

An object of this invention is to provide an adhesive composition which may be readily prepared from inexpensive and available materials, and which is of value in the manufacture of high quality hot-pressed laminated objects, particularly plywood. Another object is to provide hot-pressed plywood which has excellent shear strength even after prolonged contact with boiling water. Yet another object is to prepare improved resinous compositions which yield cured resins upon the application of heat, even in the absence of added catalysts.

These and other objects are accomplished in accordance with the invention by providing a composition containing as its essential ingredients, a diamine, such as polymethylenediamine of the formula $NH_2(CH_2)_nNH_2$, $n$ being an integer from 3 to 10, carbon bisulfide and formaldehyde. It has been discovered, in accordance with this invention, that a hexamethylenediamine-carbon bisulfide reaction product, modified by treatment with formaldehyde, may be employed as a plywood adhesive in the manufacture of hot-pressed plywood which meets United States Army and Navy requirements as set forth in Specification AN-NN-P-511b for aircraft plywood.

In one specific embodiment, this invention may be practiced by treating about 1 mol of hexamethylenediamine in an organic solvent with about 1 mol of carbon bisulfide at a temperature of about 50° to 80° C., and thereafter polymerizing the resulting reaction product in the presence of a solvent such as pyridine, and treating the polymerized product with about 1 mol of formaldehyde, preferably in alcoholic solution. The resulting solution of formaldehyde-modified hexamethylenediamine-carbon bisulfide reaction product is admixed with a relatively large volume of water whereby a precipitate is formed. The precipitate, thus obtained, is a resin which cures when heated to a temperature of about 80° to 150° C. In standard tests, plywood, prepared by coating veneers with an aqueous paste of the thermosetting resin and pressing the coated veneers together at a temperature of 100° to 175° C., preferably about 140° to 160° C., under pressure of about 30 to 300 pounds per square inch, has a dry and wet strength well above the minimum (dry, 390 pounds per square inch; wet, 290 pounds per square inch) set forth in Specification AN-NN-P-511b.

This invention is illustrated further by means of the following example.

*Example.*—A mixture containing 46.4 grams of hexamethylenediamine dissolved in 200 cc. of methanol was heated at the boiling point in a reaction vessel equipped with a reflux condenser. A solution containing 30.4 grams of carbon bisulfide in 100 cc. of methanol was introduced with rapid stirring. When about half of the carbon disulfide solution had been added a white precipitate appeared. The total carbon bisulfide solution was introduced over a period of about 10 minutes. The resulting mixture was cooled and filtered. The filter cake thus obtained was washed with methanol and was allowed to dry in the air. A portion of this dry material (10 grams) was dissolved in 40 grams of pyridine by heating at reflux temperature for one hour. Polymerization occurred, as was evidenced by the evolution of $H_2S$. To this solution was added 5.6 grams of a solution containing 50% by weight paraformaldehyde dissolved in methanol. Refluxing was continued for ½ hour. The refluxing mixture was added to one liter of water, and the precipitated product was separated from the supernatant liquid. This precipitated material was then dispersed in water in the form of a moist paste. The paste was applied to the surfaces of birch veneers at the rate of 25 pounds of solids per thousand square feet of glue line area, and the coated veneers were laminated by heating at a temperature of 145° to 150° C. under pressure of 200 pounds per square inch for 20 minutes. The resulting plywood had a dry shear strength of 640 pounds per square inch, and a wet shear strength (after being subjected to the action of boiling water for 3 hours) of 530 pounds per square inch.

The diamines which may be used in the practice of this invention include trimethylenediamine, tetramethylenediamine, 1,3-diaminobutane, pentamethylenediamine, alpha-methyl pentamethylene diamine, hexamethylenediamine, decamethylenediamine, and the like. Ethylenediamine generally gives rise to unsatisfactory results, due to the formation of cyclic monomeric compounds. The reaction between carbon disulfide and the diamine initially yields a salt, which on further heating preferably at about 80° to 250° C. is polymerized with liberation of hydrogen sulfide. During the polymerization the reaction product becomes readily soluble in pyridine. This polymeric product reacts with formaldehyde to yield a thermosetting resin, as described in the example.

One of the advantages of the adhesives of this invention is that they may be cured in the absence of acidic or alkaline catalysts. Such catalysts may be employed, but they are generally unnecessary. Another advantage of the adhesives of this invention is the remarkably high bond strength obtained even after the plywood containing this adhesive has been subjected to the action of boiling water.

The improvements in resinous compositions disclosed herein have been described with particular reference to the formaldehyde reaction products as adhesives for plywood. The compositions of the invention are likewise very valuable in numerous other practical applications, such as in the manufacture of impregnated cloth, paper, wood, etc., molding compositions, insulating, coatings, finishes and the like. In general these compositions have applicability where a resin is desired which can be converted, even in the absence of an added catalyst, to a cured resin having good resistance to the effects of water.

The example given is illustrative only, and numerous modifications of the invention will occur to those who are skilled in the art. Accordingly I do not limit myself except as set forth in the following claims.

I claim:

1. A thermosetting adhesive composition, adapted for use in manufacturing plywood, comprising an aqueous paste containing formaldehyde-modified hexamethylenediamine-carbon bisulfide reaction product.

2. A process which comprises reacting hexamethylenediamine in a solvent with carbon bisulfide at a temperature in the range of 50° to 80° C., separating the resulting reaction product from the supernatant liquor, heating the said product at about 80° to 250° C. whereby polymerization occurs, reacting the resultant product with formaldehyde in alcohol solution, whereby a formaldehyde-modified hexamethylenediamine-carbon bisulfide reaction product is obtained.

3. A process which comprises reacting hexamethylenediamine in a solvent with carbon bisulfide at a temperature in the range of 50° to 80° C., separating the resulting reaction product from the supernatant liquor, polymerizing the said reaction product by heating in the presence of pyridine, reacting the resulting mixture with formaldehyde in methanol solution, whereby a solution of formaldehyde-modified hexamethylenediamine-carbon bisulfide reaction product is obtained.

4. A process which comprises reacting at a temperature of 50° to 80° C. about 1 mol equivalent of hexamethylenediamine with a methanol solution of about 1 mol equivalent of carbon bisulfide, whereby a hexamethylenediamine-carbon bisulfide reaction product is obtained, separating the said hexamethylenediamine-carbon bisulfide reaction product from the supernatant liquor, polymerizing the said product at 80° to 250° C., and treating the resulting product with about 1 mol equivalent of formaldehyde in methanol solution, whereby a formaldehyde-modified hexamethylenediamine-carbon bisulfide reaction product is produced.

5. A thermosetting resinous composition comprising formaldehyde-modified polymethylenediamine-carbon bisulfide reaction product, said polymethylenediamine having the formula $$NH_2(CH_2)_nNH_2$$

in which $n$ has a value of from 3 to 10.

6. A thermosetting resinous composition comprising formaldehyde-modified hexamethyldiamine-carbon bisulfide reaction product.

7. A thermosetting adhesive composition, adapted for use in manufacturing plywood, comprising as the essential ingredient formaldehyde-modified hexamethylenediamine-carbon bisulfide reaction product in which the formaldehyde, hexamethylenediamine and carbon bisulfide are present in equimolar quantities.

WILLIAM B. CLARK.

REFERENCES CITED

The following references are of record in the file of this patent:

UNITED STATES PATENTS

| Number | Name | Date |
|---|---|---|
| 2,271,744 | Nevin | Feb. 3, 1942 |
| 2,320,817 | D'Alelio | June 1, 1943 |